Jan. 24, 1967   J. W. SANTOSUOSSO   3,299,989
CHOCKING MECHANISM
Filed Dec. 17, 1964   2 Sheets-Sheet 1
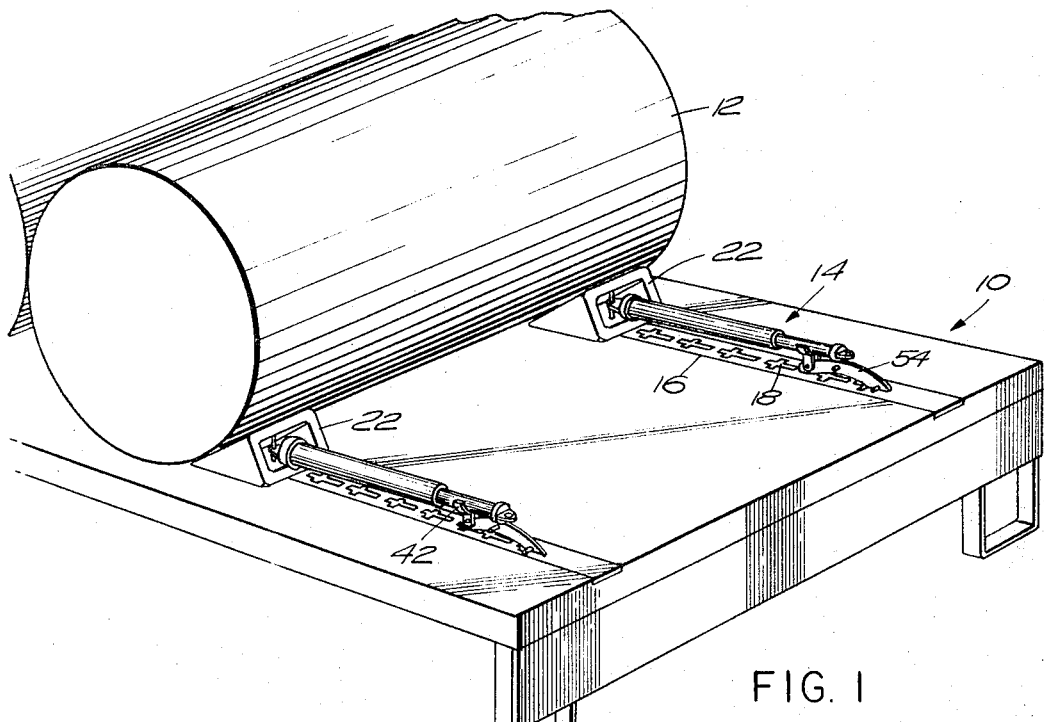
FIG. 1
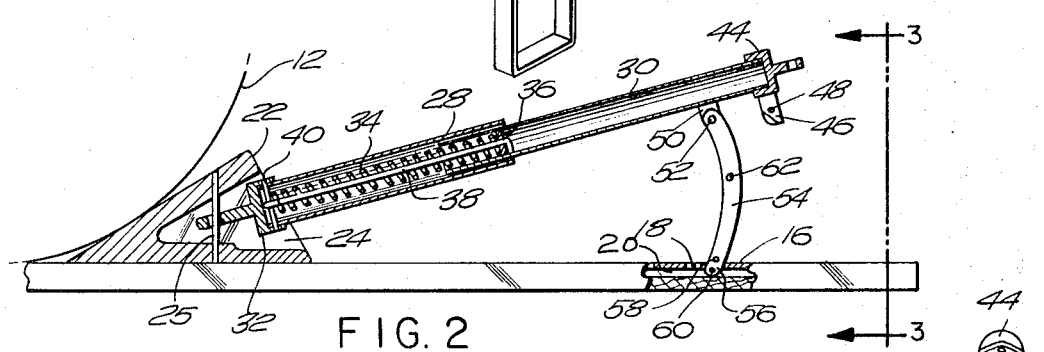
FIG. 2
FIG. 2A
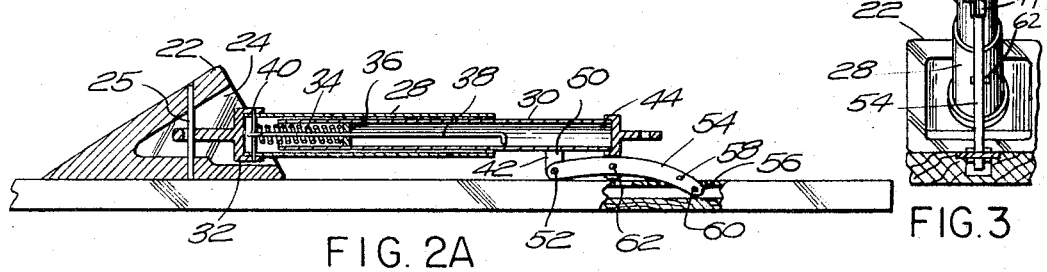
FIG. 3
INVENTOR.
JAMES W. SANTOSUOSSO
BY
Moses, Altman & Oates
ATTORNEYS Jan. 24, 1967   J. W. SANTOSUOSSO   3,299,989
CHOCKING MECHANISM Filed Dec. 17, 1964   2 Sheets-Sheet 2

INVENTOR.
JAMES W. SANTOSUOSSO
BY
ATTORNEY

3,299,989
CHOCKING MECHANISM
James W. Santosuosso, 54 Shearns St.,
Malden, Mass. 02148
Filed Dec. 17, 1964, Ser. No. 419,101
4 Claims. (Cl. 188—32)

This invention relates generally to chocking devices and more particularly is directed towards a quick locking chocking mechanism having special use in chocking loads being transported by trucks, trains and the like.

In transporting heavy loads such as rolls of newsprint, paperboard and the like, great care must be taken that the load is properly secured to the vehicle. According to present practice, large, heavy loads such as newsprint rolls, for example, are loaded transversely onto the flat bed of a truck, train or the like and secured in place by means of wooden chocks or wedges which are nailed to the truck bed. Unless the rolls are properly aligned and the chocks firmly and precisely placed, there is a very substantial risk that the chocks will work loose under the shifting weight of the roll as the vehicle moves along. It is not uncommon for an improperly secured roll to break loose and cause both personal and property damage. Since the weight of these rolls frequently may exceed several thousand pounds it will be understood that extensive damage could be caused if one breaks free from a moving vehicle.

Another problem with transporting loads of this type is that the nails used in driving the chocks into the truck bed are left in the bed after the chocks are knocked loose. Those remaining protrude and frequently cut into the roll mutilating the outside layers of the rolled material. As a result, this part of the roll cannot be used and becomes waste.

In any event, heretofore there has been no satisfactory arrangement for chocking loads onto a vehicle such as trucks, trains or the like.

Accordingly, it is an object of the present invention to provide improvements in chocking devices.

Another object of this invention is to provide an adjustable chocking mechanism which may be quickly and easily moved in and out of chocking position.

Still another object of this invention is to provide a quick locking chocking mechanism providing a resilient chocking force to a load.

More particularly, this invention features an adjustable and resilient quick locking chocking mechanism comprising a chock adapted to bear against load and having attached thereto a spring loaded telescopic member on the free end of which is mounted a pivotal arm. The free end of the arm is adapted to drivingly engage any one of a number of spaced indents formed in the truck bed. The device is operated by pushing the chock in up against the load and the free end of the arm in a detent. Forward and downward forces are applied to the telescopic member to cause the member to compress and to pivot the arm downwardly. Once the arm and the telescopic member are substantially parallel or past center, the locking mechanism is employed to hold the arm and the telescopic member in the chocking position. The chock is released by uncoupling the locking mechanism and biasing the arm upwardly so that the telescopic member extends to release the force on the chock which may then be withdrawn.

In a modification of this invention, a detachable chock extension component is provided for filling the gap between two spaced chock members holding a common load.

However, these and other features of the invention along with further objects and advantages thereof, will become more fully apparent from the following detailed description of preferred embodiments of the invention, with reference being made to the accompanying drawings in which:

FIG. 1 is a view in perspective showing a pair of chocking devices in operating position holding a roll in place on a truck bed, FIG. 2 is a view in side elevation partly in section of the FIG. 1 device in the unlocked position.

FIG. 2A is a view similar to FIG. 2 but showing the device in locked position,

FIG. 3 is an end view of the chocking mechanism,

Figure 4:
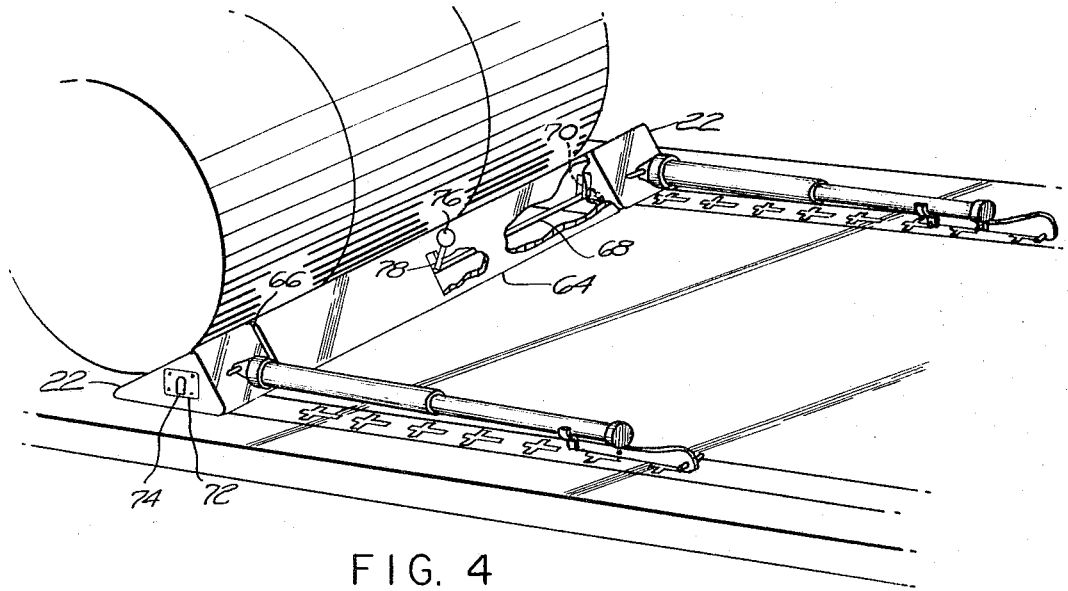
FIG. 4 is a view in perspective with parts broken away showing a modification of the invention, and, FIG. 5 is a view in perspective showing another modification of the invention.

Referring now to the drawings and to FIGS. 1 through 3 in particular, the reference character 10 generally indicates the flat bed of a truck on which are loaded rolls 12 of newsprint, paperboard or the like held in position by a pair of chocking devices 14 made according to the invention. Fastened along the flat surface of the truck bed 10 is a pair of metal strips 16, each formed with a plurality of evenly spaced T-shaped openings 18. The floor of the truck bed is channeled out as at 20 beneath the strips 14 or, alternatively, shallow recesses may be formed below each of the T-shaped openings for reasons that will presently appear. In any event a certain amount of clearance is required below the T-shaped openings 18.

The chocking device 14 comprises a wedge-shaped chock 22, triangular in cross-section and having a socket 24 in the back face thereof. A spring loaded member 26 comprising a pair of telescopically assembled tubes 28 and 30 is connected to the chock by a bolt 25 mounted through the socket.

The tube 28 which is larger in diameter than the tube 30, is provided with a cap 32 through which the bolt 25 is passed. Mounted lengthwise within the tube section 28 is a relatively heavy coil spring 34 pressed between the cap 32 at one end and a plate 36 at the other end. The plate 36 is secured across the left-hand end of the tube section 30. Extending through the center of the spring 34 is a connecting rod 38 one end of which slides through and locks against the plate 36 and the other end is secured to the cap 32 by a pin or bolt 40 extending therethrough. In practice, the rod 38 should be slightly shorter than the normal extended length of the coil spring 34 so that when the telescopic tubes are assembled the spring will be slightly loaded to eliminate any looseness or play between the parts.

At the right-hand end of the tube section 30, as viewed in FIG. 2, there are mounted spaced collars 42 and 44. The outermost collar 44 carries a downwardly extending curved leaf spring 46 having a hole 48 formed near its extremity. The collar 42 is formed with a downwardly extending finger 50 aligned with the leaf spring 46. Pivotally mounted to the finger 50 by means of a pin 52 is an arm 54 the outer free end of which is formed into a hook portion 56 carrying a pair of spaced studs 58 and 60 extending from both sides thereof. Another stud 62 is located generally midway between the ends of the arm in a position to register with the hole 48 formed in the leaf spring 46 when the arm is in a locking position.

Operation of the chocking device is as follows. One or more rolls 12 are loaded in the usual manner onto a truck bed butted against one another in a transverse position as suggested in FIGS. 1 and 2. The rolls should be parallel to one another and to whatever backing support is used such as the forward wall of the truck or the truck cab itself. In any event, once the rolls are positioned, a pair of chocking devices 14 is set in position as shown in FIG. 2. Preferably, two chocking devices are employed, one near either end of the lattermost roll as in FIG. 1. The chocks 22 are placed over the strips 16 and pushed in against the roll. Next the hook portion 56 of the arm 54 is dropped into a selected T-shaped opening 18 in the strip 16 in such a manner that the stud 58 will be located on top of the strip 16 and the stud 60 will be on the bottom side thereof with the outer end hooked portion received in the channel 20. It will be understood that the hook portion will be moved into the leg of the T-shaped opening so that the studs will hold the arm in position. Once the arm has been set in position, the operator merely pushes downwardly and forwardly on the tubular member 30 causing the tube 30 to telescope into the tube 28, compressing the spring 34 and forcing both the tubes 28 and 30 downwardly. This also causes the arm 54 to swing downwardly almost flat against the strip 16. In any event, the tube 30 is pushed down far enough for the outer curved end of the leaf spring 46 to ride over the stud 62 so that the hole 48 will register with the stud 62 whereby the spring will snap in against the arm locking the arm to the spring. This will hold the chocking device in the locking position illustrated in FIG. 2A. The chocking device is released by merely applying a little downward pressure on the tube 30 with one hand and with the other disengaging the spring 46 from the stud 62 then releasing pressure on the arm 30 so that it will bias into the upward position shown in FIG. 2.

In some instances, as where a number of short rolls are being transported, a filler piece 64 shown in FIG. 4 is connected between two chocks 22 of the type described above. This filler piece is preferably of hollow construction fabricated from aluminum, steel or the like and having a cross-section corresponding to that of the chocks 22. The filler piece is provided with end walls 66 and carries a rotatable locking rod 68 through its center. The outer ends of the locking rod extend out through the end walls and are formed into upturned ends 70. These upturned ends of the rod are employed to lock the filler piece 64 to the two chocks 22. As best shown on the left-hand side of the left chock 22 in FIG. 4, the inside face of each chock is formed with a recess over which is secured a plate 72. The plate 72 is formed with a slot opening 74 to accommodate the upturned ends 70 of the rod 68. It will thus be understood that the filler piece is connected to the chocks by inserting the upturned end into the slot opening 74 while the end is in a vertical position. Once inside the slot opening, the end 70 is rotated 90° for example, to locking engagement. To manipulate the rod during the locking operation a weighted arm 76 is fixed to and extends from the center portion of the rod. The weighted arm extends out through a slot opening 78 in the filler piece housing and is employed to rotate the rod from a locking to an unlocking position. It will be understood that the weighted end of the arm will hold the arm in a normally locked position.

Figure 5:
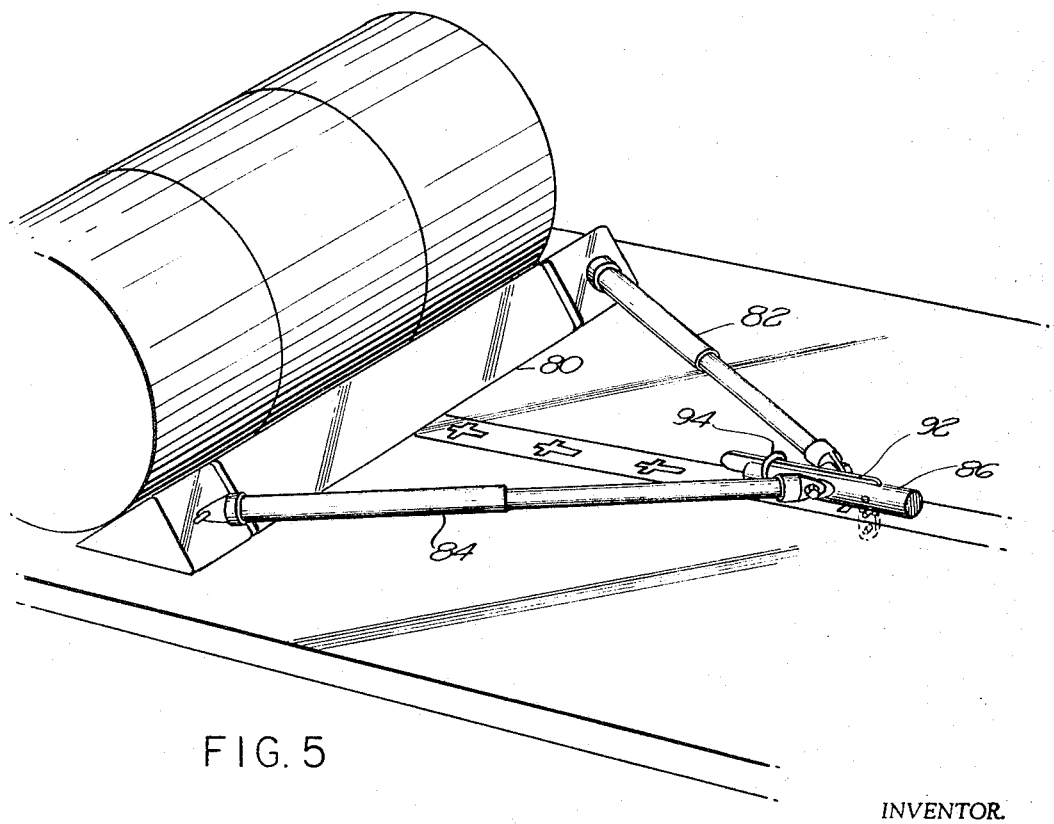

Referring now to FIG. 5 there is shown a modification of the invention and in this embodiment a relatively wide single chock 80 is employed with a pair of telescopic members 82 and 84 attached to either end thereof. The two telescopic members are connected to a common yoke 86 which carries a pivotal arm 92 to lockably engage a selected T-shaped opening 88 formed in a metal strip 90 similar to the strip 60 in the principal embodiment. The lower end of arm 92 has a configuration similar to the hook portion of the arm 54 and is adapted to lock into one of the T-shaped openings. The upper end of the arm provides leverage for biasing the arm into driving engagement when setting the chocking mechanism in place. A ring 94 is provided for holding the arm in locked position.

It will be understood that the device of FIG. 5 is operated by setting the lower end of the arm into one of the T-shaped openings and bearing down against the lever end of the arm until it is flat against the yoke 86. In this position, both rods will be compressed to some extent and the ring 94 is then slipped over the arm to hold it against the yoke so that the assembly is locked in position. The unit is unlocked by merely slipping the ring forwardly so the arm can bias upwardly to release the compressed telescopic members.

The chocking mechanisms illustrated and described herein have a number of advantages over conventional chocks. These devices may be locked in operating position much more quickly than conventional chocks which are usually nailed in place and may be removed much more quickly without leaving any protruding nails to damage the rolls when they are being unloaded. There is no damage to the truck bed as takes place with conventional chocks by a repeated nailing of chocks. The chocking mechanisms of the invention may be set in any position along the truck bed by merely selectively placing the hook portion in one of the T-shaped openings so that any size load may be accommodated. In practice, where a load involves more than one row of rolls, conventional chocks should be used without nailing for the forward rows of rolls using the present invention on the back row.

One of the main advantages in the present chocking devices is the use of the spring loaded tubes which eliminate any chance of the chocks working loose under vibration or shifting loads during transportation. As frequently happens with conventional chocks, they may work loose by the rolls shifting around under the vibration of travel. Any slack of the load when using the present chocking devices is immediately taken up by the springs 34 so that there is a constant pressure against the rolls even though some shifting may occur. Occasionally, the rolls may not be arranged exactly parallel to one another when first loaded and this condition, with conventional chocks, may cause the load ultimately to come loose as the rolls shift around during movement of the truck. However, with the present devices, the spring loaded arrangement will forge the rolls into proper alignment even though initially they may have been out of alignment.

The use of the filler piece or the wide chock makes possible the quick chocking of a mixed load. The strips used to engage the locking arm may be readily set into the floor of a truck or railroad flat car so that the top surface is flush with the floor surface. In place of grooving or forming recesses, below the T-shaped openings, the strips may be formed with offset flanges so that the center portion is raised over the floor to provide clearance for the inner end of the hook portion of the arm. The chocking mechanism may be employed for securing various types of loads in addition to the rolls illustrated. For example, the device would be particularly useful for chocking fork lifts and other machines of this character which are frequently shipped from one place to another by truck. Numerous other loads may also be conveniently chocked with the device.

While the invention has been described with particular reference to the illustrated embodiments, it will be understood that numerous modifications thereto will appear to those skilled in the art. Accordingly, the above description and accompanying drawings should be taken as illustrative of the invention and not in a limiting sense.

Having thus described the invention, what I claim and desire to obtain by Letters Patent of the United States is:

1. A device for chocking a load supported on a platform having at least one indent formed therein comprising
 (a) a chock,
 (b) a telescopic spring loaded rod connected at one end to said chock,
 (c) an arm one end of which is pivotally connected to the opposite end of said rod at a point generally corresponding to the distance between said indent and said chock and the other end of said arm is engageable with said indent whereby biasing of said arm towards said chock will telescope said rod under compression and (d) locking means for holding said arm to said rod in a biased position to urge said chock against said load.

2. A system for chocking a load supported on a platform, comprising
   (a) a plurality of spaced abutments fixed to the surface of said platform and disposed normal to said load,
   (b) a chock for placement against said load,
   (c) a spring loaded telescopic tube attached at one end to said chock and extending therefrom,
   (d) an arm pivotally mounted to the opposite end of said tube at a point generally corresponding with the distance between said chock and a selected abutment
   (e) said arm having an outer portion adapted to pivotally engage one of said abutments whereby said arm may be pivoted about said abutment towards said chock to telescopically compress said tube, and
   (f) locking means for holding said tube in a retracted compressed condition when said arm is biased into general parallelism with said tube.

3. A system for chocking a load supported on a platform, comprising
   (a) a plurality of parallel rigid strips fastened to the flat upper surface of said platform and arranged perpendicular to said load,
   (b) said strips being formed with a plurality of spaced openings therethrough,
   (c) at least a pair of chocks for placement over said strips and against said load,
   (d) a spring loaded telescopic tube connected to each of said chocks and extending outwardly therefrom away from said load
   (e) a latch arm pivotally mounted to the free end of said tube,
   (f) said arm being formed with a hook portion for engagement with one of said strip openings whereby said tube may be telescopically compressed by biasing said arm forwardly and downwardly and,
   (g) locking means connecting said tube and said arm for holding said tube in a compressed condition,
   (h) said arm extending at an angle with respect to said strips when in an extended condition and extending substantially parallel to said strips when compressed.

4. A system for chocking a load supported on a platform, comprising
   (a) plurality of parallel rigid strips fastened to the flat upper surface of said platform and arranged perpendicular to said load,
   (b) said strips being formed with a plurality of spaced openings therethrough,
   (c) at least a pair of chocks for placement over said strips and against said load,
   (d) a spring loaded telescopic tube connected to each of said chocks and extending outwardly therefrom away from said load,
   (e) a latch arm pivotally mounted to the free end of said tube,
   (f) said arm being formed with a hook portion for engagement with one of said strip openings whereby said tube may be telescopically compressed by biasing said arm forwardly and downwardly,
   (g) locking means connecting said tube and said arm for holding said tube in a compressed condition,
   (h) a filler piece for placement between a pair of spaced chocks,
   (i) said filler piece generally conforming in cross-section to said chocks, and
   (j) means for detachably connecting said filler piece to both of said chocks.

References Cited by the Examiner

UNITED STATES PATENTS 1,816,897  8/1931  Fedderman et al. __ 248—119 X
2,858,906  11/1958  Minick _____ 188—32

DUANE A. REGER, *Primary Examiner.*